Patented Dec. 6, 1938

2,139,368

UNITED STATES PATENT OFFICE 2,139,368

RUBBER DERIVATIVE COMPOSITIONS

John H. Kelly, Jr., Chicago, Ill., assignor to Monsanto Chemical Company, St. Louis, Mo., a corporation of Delaware No Drawing. Application April 26, 1934, Serial No. 722,488

1 Claim. (Cl. 134—17)

This invention relates to the manufacture of halogenated rubber containing compositions, including the halogen addition products or halide addition products of rubber, and it deals particularly with the formulation of such rubber compositions with other ingredients whereby valuable and desirable properties are imparted or enhanced in the ultimate product. The present application is a continuation-in-part of my copending application Serial Number 719,752, filed by me on April 9, 1934, and entitled Chlorinated rubber compositions, or halogen addition products or halide addition products of rubber.

Very few materials are known which will resist the attack of alkalies, both hot and cold, mineral acids, both hot and cold, common corrosive fumes, etc. Chlorinated rubber, such as is available on the market, meets these requirements so far as chemical inertness is concerned, but due to its brittleness, lack of tenacity, tendency to fracture or scale when applied to a surface, etc., it cannot be used successfully alone. Even if the original film is satisfactory it becomes brittle after exposure to hot dilute or concentrated alkalies or when subjected to long immersion in hot or cold gasoline, crude oil, sour crude distillates, etc. Obviously, this restricts seriously the utility of these materials in the arts.

I have tried various plasticizing substances to overcome these defects. Many of these are esters which must be incorporated in substantial quantities to impart the necessary softening action to produce a non-brittle film. However, the addition of the required amount of such common plasticizers as dibutyl phthalate, triphenyl phosphate and so on, causes the film to lose its chemical inertness. Whether this is due to the hydrolysis and/or leaching out of the plasticizer I do not know. However, I have found that when such film is exposed to the attack of chemicals it becomes permeable or scales and chips from the surface.

I have now found that neutral glycolyl esters and glycolyl ester homologues, particularly neutral glycolyl esters of dicarboxylic acid such as phthalic acids, succinic acid, etc., not only impart the required degree of flexibility without impairing its resistance to the action of chemicals but are effective when used in very small amounts. In fact, the amount of my plasticizer which is required to impart the desired degree of flexibility is very materially less than required by such common present day plasticizers as dibutyl phthalate and triphenyl phosphate, etc.

The preferred plasticizers are neutral esters embodying a glycolic acid nucleus or a homologue thereof. The carboxyl group of the glycolic acid is joined to an alcohol group and the hydroxyl group of the glycolic acid is joined to an aromatic acid such as benzoic acid or to a dicarboxylic acid. In the case of dicarboxylic acids, one carboxyl group is joined to the glycolyl ester whereas the other carboxyl group may be joined to some other alcohol group. The compound is insoluble in water and otherwise chemically inert for my purpose. Homologues of glycolic acid which may be employed include hydroxy propionic acid (lactic acid), alpha or beta hydroxy butyric acid. The alcohol group attached to the carboxyl group of the glycolic acid is preferably an aliphatic alcohol group such as methyl, ethyl, butyl, amyl, mono methyl ether of ethylene glycol, cyclohexyl, benzyl, etc. In the case of dicarboxylic acids in which only one of the carboxyl groups is esterified by a glycolyl ester group, the other carboxyl group is esterified preferably by an alcohol such as methyl, ethyl, propyl, butyl, amyl, cyclohexyl, benzyl, phenol, etc. or by another glycolyl ester.

Representative compounds contemplated by the present invention may be made in the following manner:

The mono sodium salt of ethyl phthalate may be prepared conveniently by refluxing, preferably with mechanical agitation, 400 kilos of phthalic anhydride and 880 liters of absolute ethyl alcohol. The mixture is then allowed to cool to approximately 50° C., after which 159 kilos of anhydrous sodium carbonate are added slowly in order to avoid violent interaction. The resulting mixture is then heated, preferably with agitation, to assure the completion of the reaction. Thereafter 367.5 kilos of ethyl chloracetate (ethyl ester of chloracetic acid) are added slowly while the mixture is agitated and maintained at the temperature of a steam bath.

The resulting reaction mixture is filtered from the sodium chloride which is washed with alcohol. The alcohol is recovered by distillation, and the residual oil is steam distilled for three hours at approximately 100° C. The product so obtained is washed with a sodium carbonate solution until the solution is faintly alkaline to phenolphthalein. If desired the ester may be treated with decolorizing charcoal in the usual manner. For this purpose 1% of Darco, based on the weight of the oil product, is uniformly distributed therein, after which the mixture is maintained at 90° C. for approximately one hour before removing the carbon by filtration.

The reaction may be represented as follows:

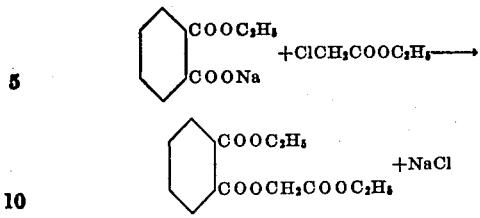

The product boils at 223° C.–224° C. at 24 millimeters without decomposition. It crystallizes at approximately 20° C.

In lieu of the chloracetate ester one may employ an ester of other mono chlor substituted fatty acids such as chlor propionic acid or a chlor butyric acid.

Obviously, in lieu of the ethyl sodium phthalate employed in the foregoing example, one may prepare the corresponding methyl, propyl, butyl, benzyl, as well as phenyl sodium phthalate. Similarly, in lieu of the ethyl ester of chlor acetic acid, one may substitute the chloracetic acid ester of cresol, phenol or of methyl, propyl, butyl, amyl, or benzyl alcohol, as well as of mono alkyl ether esters of glycol such as the mono ethyl ether ester of ethylene glycol and the dialkyl ether ester or glycerol, etc. The esters of chloracetic acid may be replaced by the esters of other chlor fatty acids such as the alpha or beta chlor propionic acid esters or mixtures thereof.

By reacting di sodium phthalate with two mols of an alkyl chloracetate or a mixture of alkyl chloracetates the corresponding phthalyl di (alkyl glycolates) are obtained.

One example of this reaction may be represented as follows:

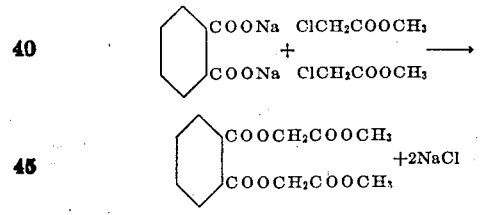

In lieu of phthalic acid or phthalic anhydride, one may substitute a chlorphthalic acid, succinic acid, maleic acid, adipic and similar dicarboxylic acids or their anhydrides. The same products are obtained by the interaction of the acid chlorides of dicarboxylic acids with glycolic esters and homologues thereof such as the esters of alpha or beta hydroxy propionic and hydroxy butyric acids. This reaction may be represented as follows:

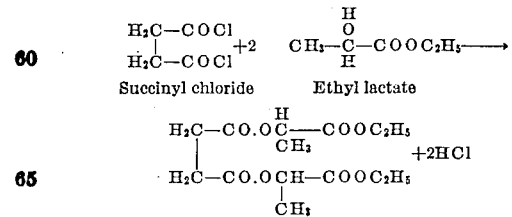

I have likewise found that the alkyl, aryl or aralkyl glycolate esters of monocarboxylic aromatic acids, such as the benzoic acid ester of ethyl glycolate may be employed advantageously as dibutyl phthalate substitutes. These are prepared by reacting a metallic salt of the acid such as sodium benzoate with a chloracetate ester.

The addition of small amounts of my plasticizers such, for example, as butyl phthalyl butyl glycolate, to chlorinated rubber paints or paints made from halogen addition products or the halide addition products, polymers or oxides of rubber, creates a product eminently suitable for resisting alcohols, brandies, potable spirits, foodstuff and the like, or phosphoric acid, etc., as the addition of butyl phthalyl butyl glycolate creates a nontoxic, tasteless paint film that is permanently flexible and is uninjured by the contact with the materials or substances just mentioned.

Additions of small amounts (ranging in practice from about 5% to 25%, by weight, of the rubber composition) of my plasticizers as, for example, methyl phthalyl ethyl glycolate and ethyl phthalyl ethyl glycolate to chlorinated rubber paints or paints made from halogen addition products or halide addition products, polymers or oxides of rubber, in suitable amounts, furnish hard, flexible films perfectly resistant to the action of petroleum oils, gasoline, crudes and sludge. These plasticizers do not leach from the films and are capable of withstanding hot or cold petroleum or petroleum products without making the paint or varnish films brittle. Therefore, paint or varnish films containing these plasticizers offer extremely good protection to tank cars carrying oils and gasolines, field oil storage tanks storing oils of a more or less corrosive nature, etc., concrete surfaces, etc.

The fact that only comparatively small amounts of these materials are necessary to impart a relatively permanent degree of flexibility and toughness is a decided advantage. It is to be understood that the invention is not limited to protective coating compositions but extends to molded chlorinated rubber products, as well as indurating and insulating compositions, where the resistance to attack of chemical reagents may be less important or unimportant. In general, the amount of plasticizer required will depend upon the use to which the ultimate product is put. Thus, in the case of protective coating films, if the original is subjected to flexing or vibration it is desirable to incorporate relatively more of the plasticizer than would otherwise be required. Similarly, in the manufacture of molded or indurated products, the amount of the plasticizer will depend upon the conditions to which the product is subjected as well as the amount of filler, if any, the character of the fibrous base to be indurated, etc. The effect of these various factors is in general understood by those skilled in the art. It is likewise to be understood that the type of chlorinated rubber may be varied, although in general and for most purposes the product now distributed by the Hercules Powder Company under its trade names gives satisfactory results.

The following examples illustrate specific embodiments of my invention:

*Example I.*—A protective coating which will be found to resist gasoline and hot oil is prepared by dissolving 100 parts of chlorinated rubber in 700–800 parts of aromatic spirits or solvent naphtha consisting essentially of toluol, xylol, etc. If desired, 250 parts of mineral pigment may be incorporated, such as iron oxide, aluminum metal, titanium oxide, etc. To the resulting solution there is added 8 parts of ethyl glycolyl methyl phthalate. The resulting mixture is applied to the surface by brushing in the usual manner. In case it is desired to spray the composition the amount of solvent is increased to 1200 parts. The foregoing composition is particularly suited for a primer coat. In top coats I prefer to increase the amount of plasticizer to approximately 12 parts of the ethyl glycolyl methyl phthalate.

*Example II.*—Substitute ethyl glycolyl ethyl phthalate for the ethyl glycolyl methyl phthalate in Example I and otherwise proceed as set forth in Example I.

*Example III.*—Where fruit juices, brandies, grain alcohol and the like are transported it is desirable that such coating shall not impart a foreign taste to the product. The following formula is particularly well suited for such uses. It will also be found to resist inorganic acids or alkalies, either hot or cold.

100 parts of chlorinated rubber are dissolved in an aromatic hydrocarbon solvent as in Example I and, if desired, 250 parts of pigment are incorporated. For a priming coat 4 to 8 parts of butyl glycolyl butyl phthalate are added to the mixture, after which it is sprayed or brushed on the surface, care being exercised in all cases to keep the surface dry. For top coats the amount of plasticizer is increased, preferably to 6–12 parts.

Where the film will be subjected to vibration one may employ correspondingly greater amounts of my plasticizer as explained heretofore.

Coating compositions made according to my invention have been found to be eminently suitable in resisting attack by alcohols, brandies, potable spirits, foodstuffs and the like, acids including phosphoric acid and alkalies. The film is non-toxic, tasteless and permanently flexible even after prolonged exposure, thus differing from films produced when using such common and rather closely related substances as the simple esters of phthalic acid, phosphoric acid, etc. Additions of small amounts of my plasticizers, which generally range from 5% to 25% by weight of the rubber composition, furnish hard, flexible films perfectly resistant to the attack of petroleum oils, gasoline, crude oil, petroleum sludges and corrosive fumes. Unlike present-day plasticizers, my plasticizers do not leach from the films and are susceptible of withstanding hot or cold petroleum products. Accordingly, paint or varnish films containing these plasticizers offer extremely good protection to tank cars carrying oils and gasolines, field oil storage tanks storing oils of a more or less corrosive nature, etc., concrete surfaces, electrical insulation, etc.

What I claim is:

Paint or varnish solutions comprising chlorinated rubber, or the halogen addition products, polymers or oxides of rubber dissolved in suitable solvents, said solution also containing a substance selected from the group consisting of butyl phthalyl butyl glycollate, methyl phthalyl ethyl glycollate, and ethyl phthalyl ethyl glycollate in amounts necessary to give permanently flexible varnish or paint films, resistant to change when exposed to hot or cold dilute or concentrated sodium or potassium hydroxides, trisodium phosphate and other alkaline materials.

JOHN H. KELLY, Jr.